Sept. 23, 1969 J. W. GREEN 3,469,038

TIME ANNOUNCER

Filed Aug. 23, 1965 2 Sheets-Sheet 1

INVENTOR.
JAMES W. GREEN

BY Warren T. Jessup
ATTORNEY

JAMES W. GREEN
INVENTOR

BY Warren T. Jessup
ATTORNEY

United States Patent Office 3,469,038
Patented Sept. 23, 1969

3,469,038
TIME ANNOUNCER
James W. Green, Lynwood, Calif., assignor, by mesne assignments, to Magnasync Moviola, a corporation of California
Filed Aug. 23, 1965, Ser. No. 481,614
Int. Cl. G11b 5/06
U.S. Cl. 179—100.2 2 Claims

ABSTRACT OF THE DISCLOSURE

A time announcing system is provided whereby accurate time announcements may be recorded on a magnetic tape in correlation with other recorded information for subsequent reproduction.

This invention relates to a time announcer which provides an exact time source that can be injected on tape at one-minute intervals to correlate recorded information with actual time. Thus, it relates in general to timing devices, but relates more specifically to a means for producing a recordable read-out signal which may be recorded, and thereafter re-played, as an audibly, spoken military time report.

This device is especially adaptable for providing "back-up" time data in communications recording. Because of the complexity of handling modern airport traffic, all radio communication is normally recorded around the clock and stored for a reasonable period of time, in order that any error may be traced to its source.

To make such a recording meaningful, it is necessary to relate the conversation or intelligence on the tape to a precise moment of time.

This invention is an improvement on prior devices for providing a recording of time superimposed upon a magnetic tape, such that as the tape is played back, the time will appear at regular intervals as an audible announcement.

It would appear to be obvious that this task could not be feasibly assigned to a human, but rather is of necessity produced by a mechanical means for dependability and precision. Nevertheless, it is desired that the recording on the ultimate tape be a spoken signal in order that the monitoring of the tape will not require visual concentration to relate the message to time.

It is, therefore, an object of this invention to provide a compact, dependable, and relatively inexpensive device for these purposes.

For a full understanding of the invention, a detailed description of a preferred embodiment of the Time Announcer will now be given in conjunction with the accompanying drawings and the features forming the invention will then be specifically pointed out in the appended claims.

Figure 1:
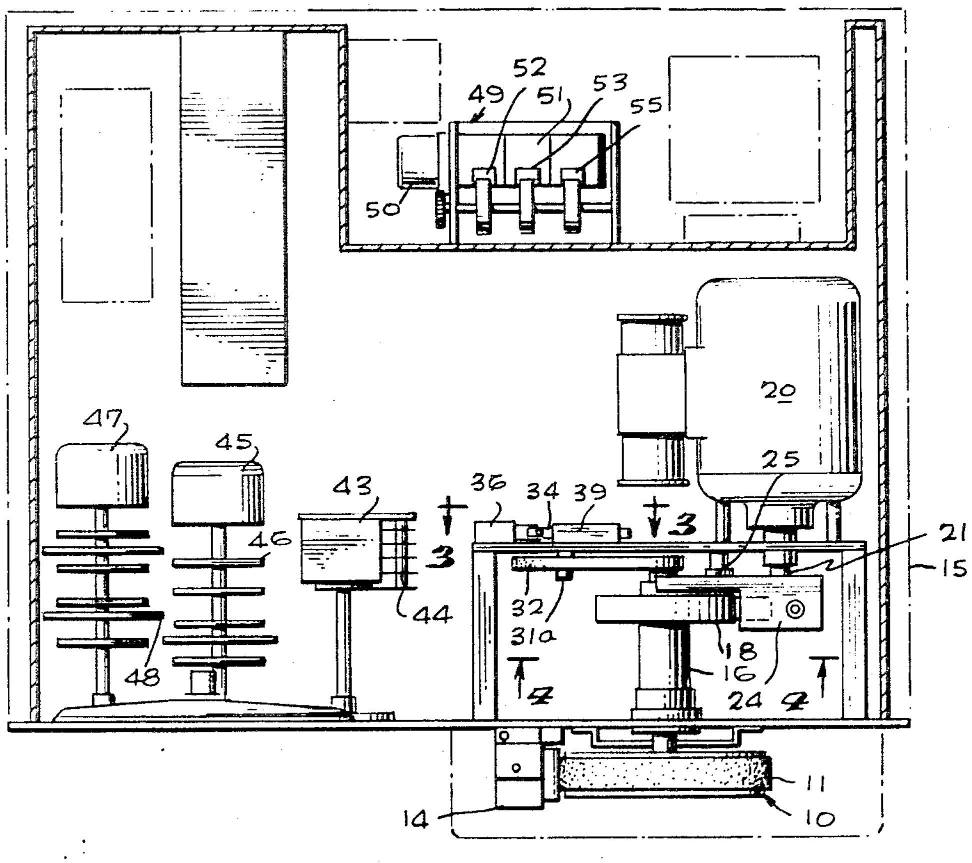
FIGURE 1 is a top-plan view of the essential mechanical equipment of the present invention necessary for an understanding of the operation of the preferred embodiment of the invention.
Figure 2:
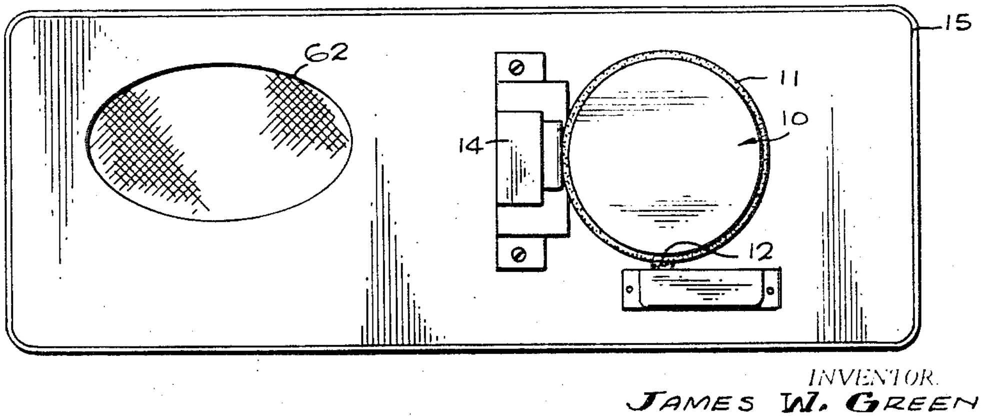
FIGURE 2 is a front elevation of the cabinet and a record drum.
Figure 3:
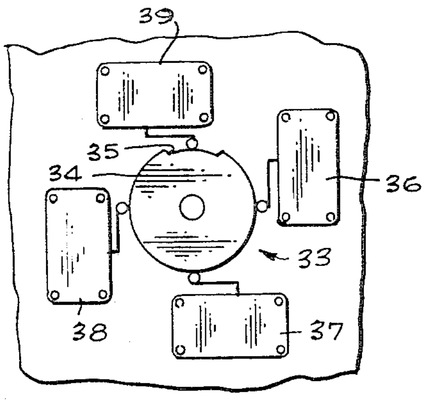
FIGURE 3 is a view taken alone line 3—3 of FIGURE 1.

The illustrated embodiment of the invention is a preferred embodiment and is the essence of simplicity and dependability. In FIGURES 1 and 2, a rotary drum 10 is shown as being a recorded source of intelligence. The drum has a rim 11 of magnetizable recording material capable of being recorded in thin bands or tracks. In the use of this invention as a read-out device for providing back-up time data on tape recordings, the rim 11 is recorded in ten channels. Generally, the recording is done by the use of a human voice, although other sounds, tones, or simulated voices are useful.

In the illustrated embodiment, an oil-fed wick 12 lubricates the surface of the rim 11 in order that friction against pick-up heads may be reduced and wear held to a minimum.

Figure 5:
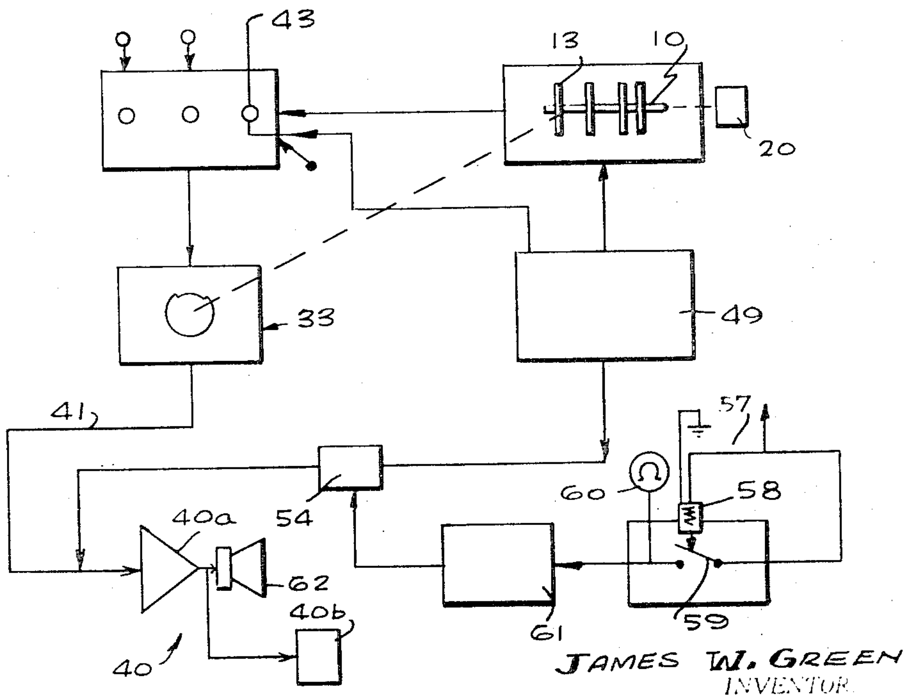
FIGURE 5 is a diagrammatic illustration of the electrical and mechanical relationship of this invention.

The drum 10, for the purposes of the illustrative use of this invention, is recorded with ten tracks. In FIGURE 5, three separate discs are shown as a schematic illustration to set forth the fact that a plurality of tracks 13 may be recorded upon the drum 10.

A pick-up head 14 is provided to carry a bank of ten individual heads in transducing relationship to the surface of the rim 11. The oil from wick 12 will aid in wear prevention between the individual heads and the surface.

This portion of the illustrated embodiment is substantially conventional in that a recording medium has recorded thereon a spoken word or other signal of intelligence, and a transducing arrangement is provided by placing pick-up heads adjacent the surface. As these members move relative to one another, there will be a transducing of the recorded intelligence into an electrical output signal. Thus, whether a conventional recording or other device, this portion of the invention represents a source of ten distinct pieces of intelligence, or messages, and a means to bring forth those pieces of intelligence as an electrical signal, each differing from the other.

Referring to the FIGURE 1, a housing cabinet 15 provides support for a shaft 16 extending from the rear face of the drum 10. A drive wheel 18 on the end of shaft 16 serves as a portion of a gear reduction as well as a convenient drive surface.

An electric motor 20 having a shaft 21 is held by bracket supports in cabinet 15 in substantially parallel relationship to the shaft 16.

Figure 4:
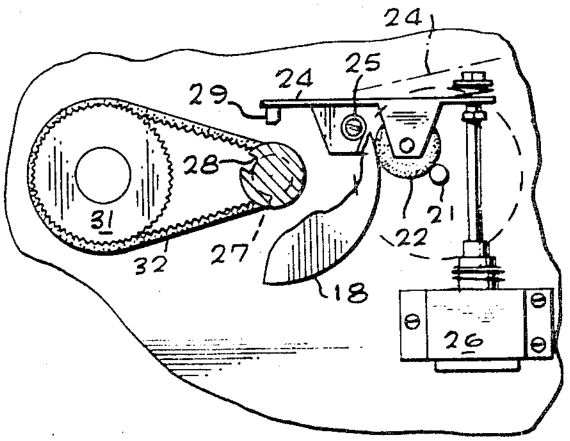
FIGURE 4 is a view taken generally along the line 4—4 of FIGURE 1, with parts broken away to illustrate the relationship.

An intermediate drive wheel 22, best shown in FIGURE 4 of the drawings, is carried by a lever 24. Lever 24 in turn is mounted on pivot 25 and actuated by solenoid 26. The energized position of solenoid 26 is shown in FIGURE 4. The core of the solenoid is pulled down to swing the lever 24 into the position shown, wedging the intermediate drive wheel 22 between the motor shaft 21 and the surface of the drive wheel 18. The drive wheel 22 is preferably a yieldable, but stiff, material capable of good drive transmission, but sufficiently yieldable to absorb shocks. Upon de-energization of solenoid 26, conventional spring devices cause the core to be pulled up and pivot the lever 24 into the phantom position shown.

A sprocket 27 carried on the end of shaft 16 has a notch 28 therein. A detent 29 on the end of lever 24, opposite wheel 22, is positioned to enter the notch 28 and lock the sprocket 27, and, hence, the drum 10, in a non-rotative condition, at the beginning position of a cycle. The detent can drop into the notch 28 only when power is withdrawn from the drive wheel 18, because of the fact that the intermediate wheel 22 is carried by lever 24 and must withdraw in order to seat the detent 29.

A companion gear 31, as shown in FIGURE 4, is connected to be driven from the sprocket 27 by means of a belt 32. The sprocket 27, gear 31, and belt 32 are provided with lateral ribs in order to produce an interlock drive of non-slip character. The ratio of the drive is such that the gear 31 will rotate through one complete 360° cycle as the drum 10 rotates four complete cycles. Thus, a ratio of four-to-one is established.

The purpose of the gear 31 rotating in four-to-one relationship is related to the use of four distinct numbers chronologically spoken in the illustrated embodiment of the invention to produce military time read-out.

On the opposite side of the structural member supporting the gear 31 is a rotary switch assembly 33. Switch 33 has a central cam 34 which is mounted on a shaft 31*a* in common with the gear 31, and, therefore, rotates in one-to-one relationship with gear 31.

This rotary switch 33 is produced with independent contact switches 36 through 39, which serve as contacts in the ordinary concept of switching. Note that the cam 34 has a recess 35 of predetermined length along the surface. Each of the contact switches has a contact arm which activates the switch by dropping into the recess. Hence, the individual contact switches are active for a period of time which is predetermined by the length of the recess 35. In the illustrated embodiment, the length of the recess 35 is approximately 25% of the total circumference. Thus, one of the four switches is always closed, and, therefore, the output is free of noise.

In the FIGURE 5, which is a relating schematic view, an output circuit is indicated at the reference numeral 40. Such output circuit is of conventional amplifier system 40*a*, feeding a speaker 62 and a recorder 40*b*. Some of the space in the FIGURE 1 is taken up by such conventional equipment. A lead 41 from the rotary switch 33 carries signals from the four switch contacts 36 through 39 in sequence to the output circuit. Hence, four different signals may be led to the contacts, but only one signal will be fed to the output circuit during any given period of time, and, hence, will be fed to output in sequence.

This invention is seen to be a means for producing groups of distinct, recordable, electrical signals, each group comprising a plurality of such signals, and the groups being produced at regular intervals of time corresponding to a reference standard.

The means shown thus far to produce this effect is a drum having a peripheral rim of recording media with ten tracks recorded thereon, each recording being one spoken word, each different from the other, the words consisting of "one" through "nine" and "zero." That is, if selected chronologically, the voice would be heard to repeat the nine digits and zero.

Ten pick-up heads operate in transducing relationship to the ten tracks for transducing all ten words at one time. However, ten spoken words at one time to an output circuit would be a jumble. This invention first selects the proper four words to convey the proper time, and sends signals from the proper four tracks to the four switch contacts 36 through 39. Thus, the four selected signals, are fed one after another, by means of the sequential operation of the switch 33 to an output circuit and are then heard individually. By rotating the drum 10 four times, the transduced signal will be available four times to each of the contact switches. However, each switch is active only one-fourth of the time, which matches exactly with one of the four rotations of the drum 10, and, hence, only one signal series, or word group, comes out to the output circuit.

The purpose of the electric circuitry is to provide means for selecting four signals representing four words and placing them into an output circuit in sequence to speak the corresponding time of day in military time, and to provide means for altering the selection each minute to provide a progressive time report.

Specifically, and as indicated in FIGURES 1 and 5, a first rotary solenoid 43 is provided which has a series of fixed contacts 44 respectively connected to the ten heads associated with the drum 10. The solenoid 43 is pulsed at one minute intervals by a control center 49 (to be described), so that its movable contact steps from one fixed contact to the next at one minute intervals. During these intervals, the solenoid 43 successively outputs the words "zero," "one" . . . "nine." At the end of each cycle, the solenoid 43 applies a pulse to rotary solenoid 45 so as to cause the movable contact of the latter solenoid to step from one fixed contact 46 to the next. The solenoid 45 has its fixed contacts 46 connected respectively to the heads corresponding to the words "zero," "one," "two," "three," "four," "five."

It will be appreciated that the movable contact of the solenoid 45 is stepped in this manner from one fixed contact to the next at ten minutes intervals, and that the solenoid 45 successively outputs the words "zero" . . . "five." At the end of each cycle of the solenoid 45, it applies a pulse to an additional rotary solenoid 47 to cause the movable contact of the latter solenoid to step from one fixed contact 48 to the next. The fixed contacts 48 of the solenoid 47 are connected respectively to the heads corresponding to "zero" . . . "nine." The movable contact of the rotary solenoid 47, therefore, is stepped from one fixed contact to the next at one hour intervals, and it successively outputs the words "zero" . . . "nine." A further rotary solenoid (not shown) receives a pulse from the solenoid 47 at the end of each cycle, so that its movable contact may be stepped from one fixed contact to the next. The latter solenoid has fixed contacts connected to the heads corresponding to "zero," "one" and "two," and its outputs the words "zero," "one," "two," as it is successively stepped about its cycle. Therefore, the time signals provided by the rotary solenoids correspond to the military twenty-four hour time scale.

Thus, the selection of the four units of intelligence are made by means of the electrical circuitry which includes these switch means, which switch means are characterized by being advanceable by unit increments through a cycle wherein said circuitry is connected to place a plurality of the transducer heads in communication with a like plurality of output leads, and to change the head selection upon each switch advancement in a meaningful sequence. There are four live circuits created by advancement of this switch means, selecting four pickup heads and connecting those heads to the proper four contact switches 36 through 39, where they are then sequentially fed to the output circuit.

In order to begin the entire sequential operation, a control center 49, as seen best in FIGURE 1 and the schematic FIGURE 5, is provided. An electric clock synchronous motor 50 is the operating heart of this control.

The motor 50 drives a rotary cam arm 51 and operates three switches 52, 53, and 55. When switch 52 is actuated, a signal is sent out from the control center 49 to the rotary solenoid 43, and as previously explained, the solenoids 45 and 47 operate through signals received from the contacts 44 on solenoid 43. Next, a switch 53 is activated to start the motor 20, and thereafter activate the solenoid 26. This brings the drum 10 and the rotary switch 33 into activity, producing the ten signals which are then selected by the switch means as described.

Thus, the control center first sets up the circuitry for the proper selection of four words, and thereafter begins the production of those words and the sequential picking of those words off the switch means.

A signal generator 54 is provided which gives the tonal sound generally associated with attention attraction in communications. It is the familiar "beep" signal. A switch 55 is provided in the control center 49, and this switch 55 operates prior to the commencement of the actuation of motor 20 by the switch 53. Thus, the tone is a signal to the listener to be prepared to receive the time statement. Signal generator 54 is operated directly through the switch 55, and normally there is no other influence operative.

In order to detect a power interruption, which would produce inaccurate time reports, a fail sensor 57 is provided. Sensor 57 includes a relay 58 with a normally-open contact 59, together with a signal light 60. The relay 58 is connected to receive power from the same source that powers the balance of the equipment, and, therefore, is normally energized. It is operatively connected to close the contact 59 upon release by power failure, and remains unenergized until manually reset. The contact 59 is connected to deliver power, when closed, from the source. Thus, if there has been a power failure, and the switch 59 closed, power will become available to the light 60 for visual indication that there has been a failure.

Additionally, a modulator 61 is brought into activity by connection through the contact 59. Modulator 51 excites the signal generator 54 to an output of a tone differing from the regular tone, and at a regular continuous rate in order to attract attention.

The apparatus of this invention may be supplied with a speaker 62 as well as visual letters which are changed simultaneously with the reproduction of the signals, for local clock purposes and for checking accuracy of the signal being recorded on the associated apparatus.

While the instant invention has been shown and described herein in what is conceived to be the most practical and preferred embodiment, it is recognized that departures may be made therefrom within the scope of the invention which is, therefore, not to be limited to the details disclosed herein, but is to be afforded the full scope of the invention as hereinafter claimed.

What is claimed is:

1. Means for producing groups of distinct, recordable, electrical signals, each group comprising a plurality of such signals, said groups being produced at regular intervals of time corresponding to a reference standard, said means comprising:

a recorded source including a magnetic recording medium having a plurality of tracks, each track having recorded thereon an intelligence distinct from each of the other tracks;

a pick-up head means including individual electromagnetic pick-up heads in transducing relationship with the respective tracks of said source, moving means for driving the source and head relative to one another for providing a selection of a track and pickup head relationship, and solenoid operated means selectively coupling said moving means to drive said source and head relative to one another;

electric circuitry including solenoid-actuated switch means, said solenoid actuated switch means being characterized by being advanceable by unit increments through a cycle wherein said circuitry is connected to place a plurality of said heads in communication with a like plurality of output leads, and to change the head selection upon each switch advancement in a meaningful sequence;

timing means applying electric pulses to said solenoid-actuated switch means for advancing said switch means at regular intervals and for controlling said moving means by actuating said solenoid-operated means, said timing means causing said recorded source and head to move through a plurality of full cycles corresponding to the number of said tracks selected to be connected in group sequence to said output leads;

sequence switch means for sequentially connecting said output leads to an output circuit; an electric clock motor and timer device having one switch for advancing said solenoid-actuated switch means, having a second switch for actuating said solenoid-operated means of said moving means, and having another switch and circuit means for supplying a tone prior to the activation of said moving means by said second switch.

2. In the combination defined in claim 1, and which includes power interruption detecting means coupled to said circuit means to change said tone when a power interruption occurs.

References Cited

UNITED STATES PATENTS

| | | | |
|---|---|---|---|
| 1,530,363 | 3/1925 | Hayden | 179—6 |
| 1,889,108 | 11/1932 | Rättig | 179—6 |
| 1,967,778 | 7/1934 | Meyers et al. | 179—6 |

BERNARD KONICK, Primary Examiner

J. R. GOUDEAU, Assistant Examiner

U.S. Cl. X.R.

179—6, 100.1